March 17, 1936.　　　　J. W. FLATT　　　　2,034,177
CUTTING AND DRAWING TABLE
Filed Oct. 20, 1933　　　4 Sheets-Sheet 1
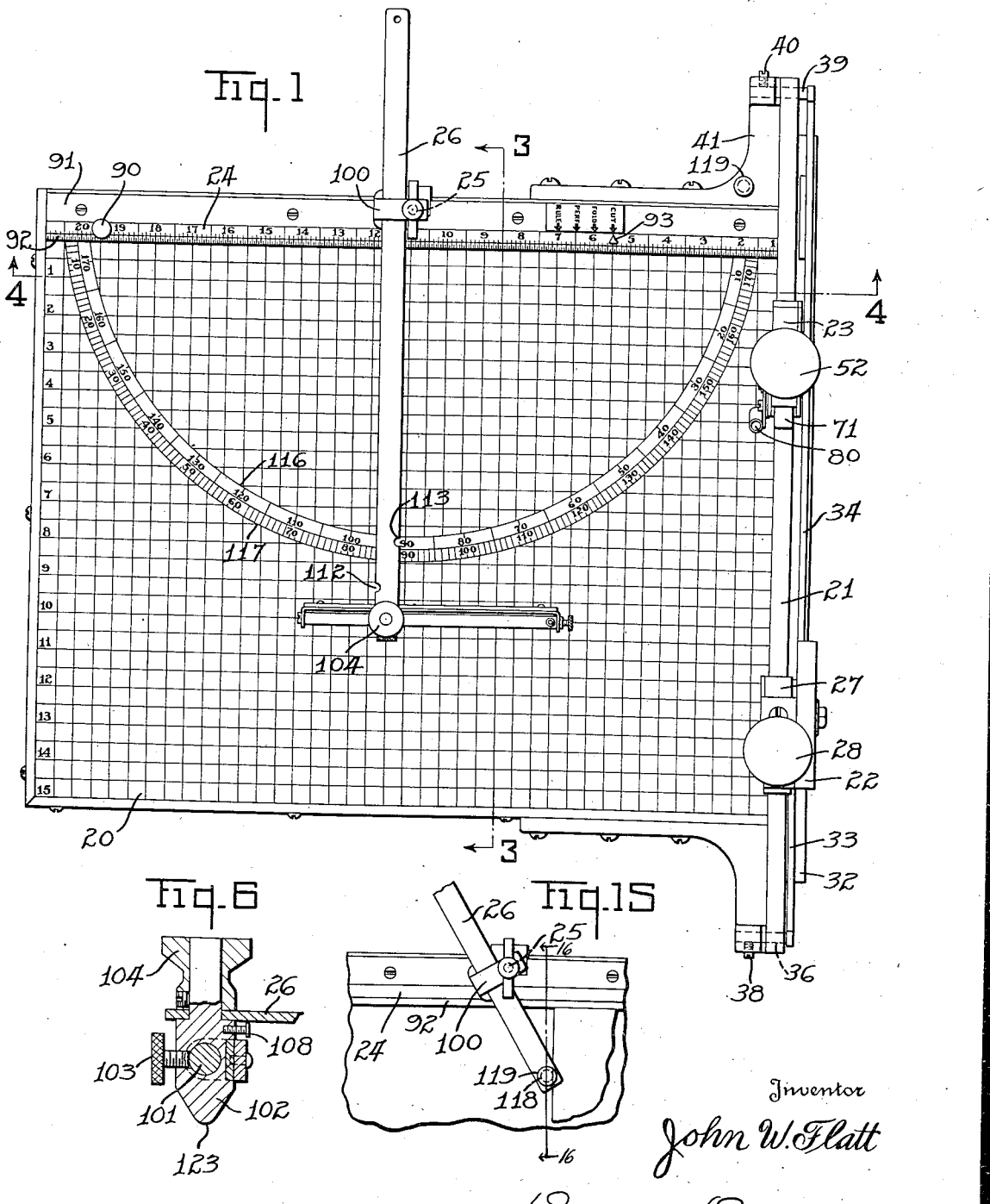

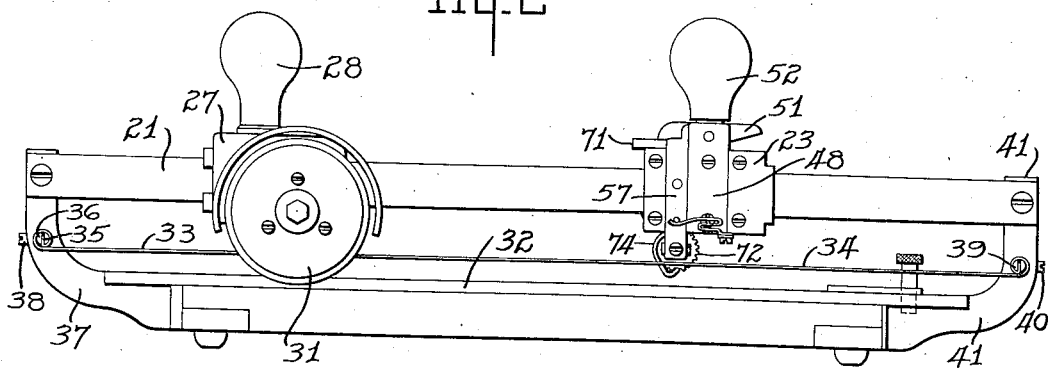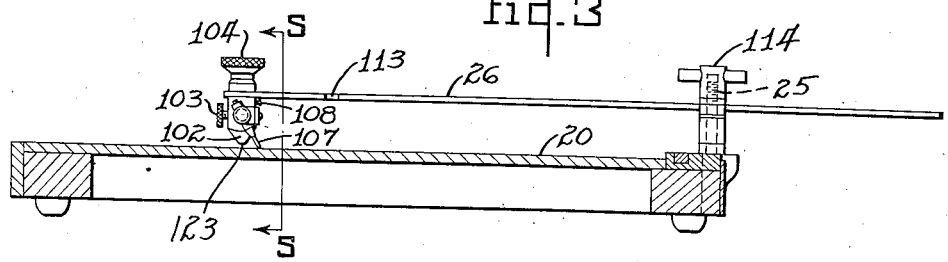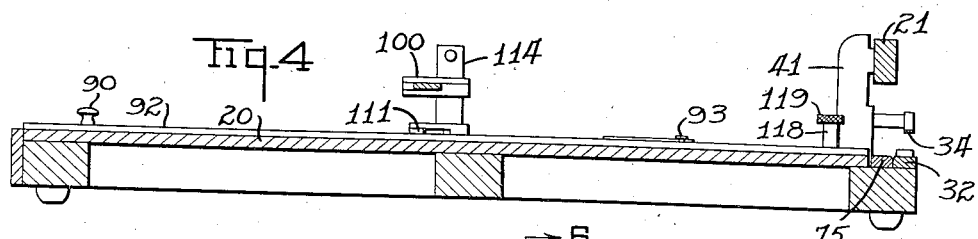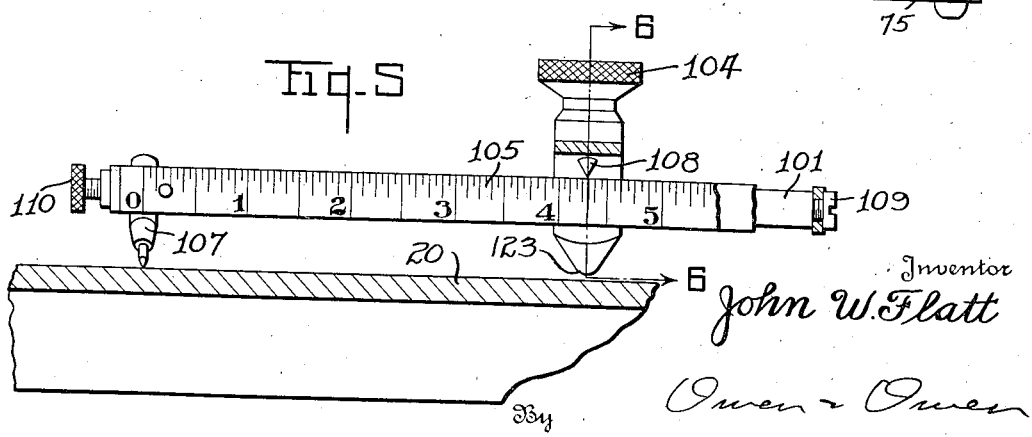

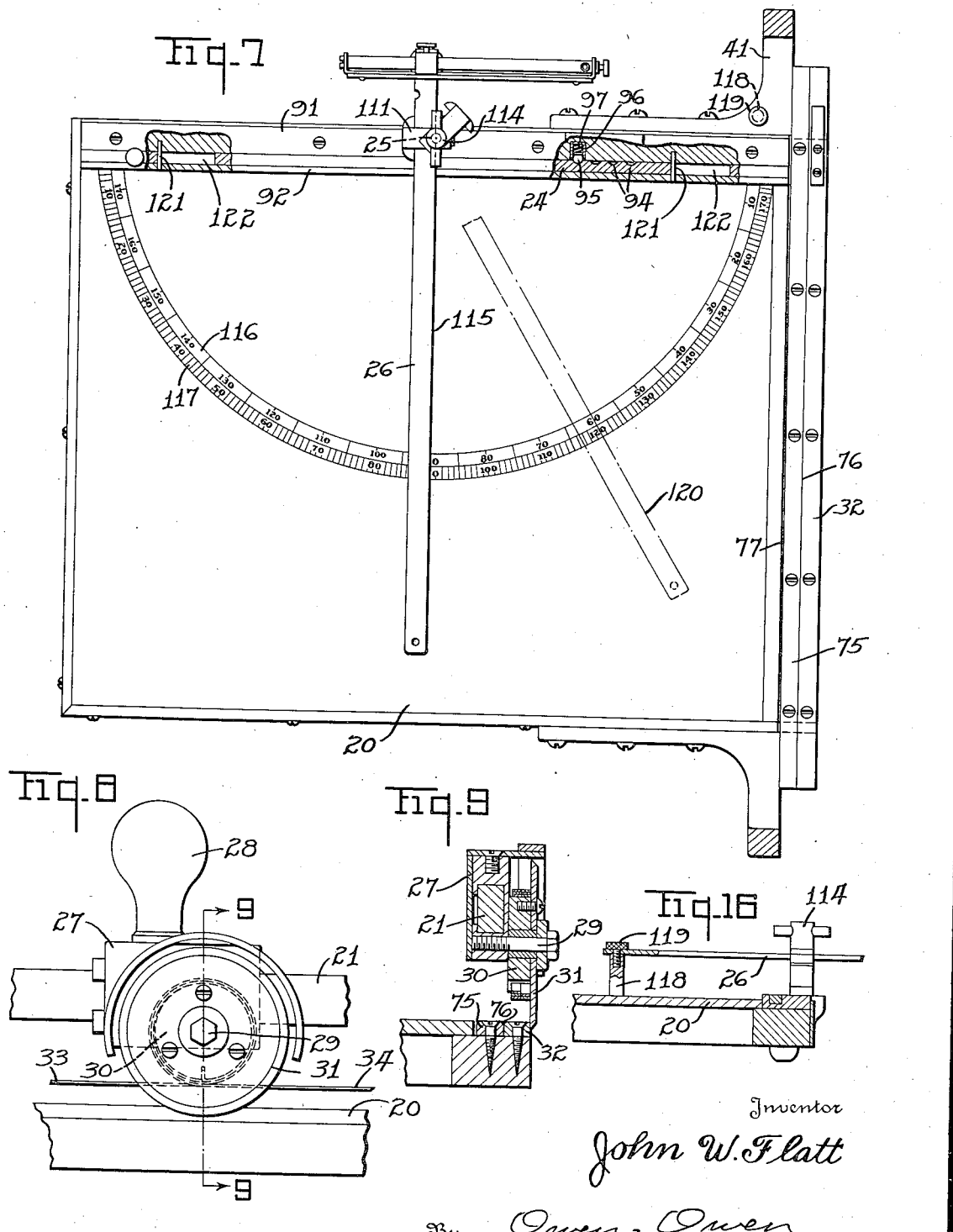

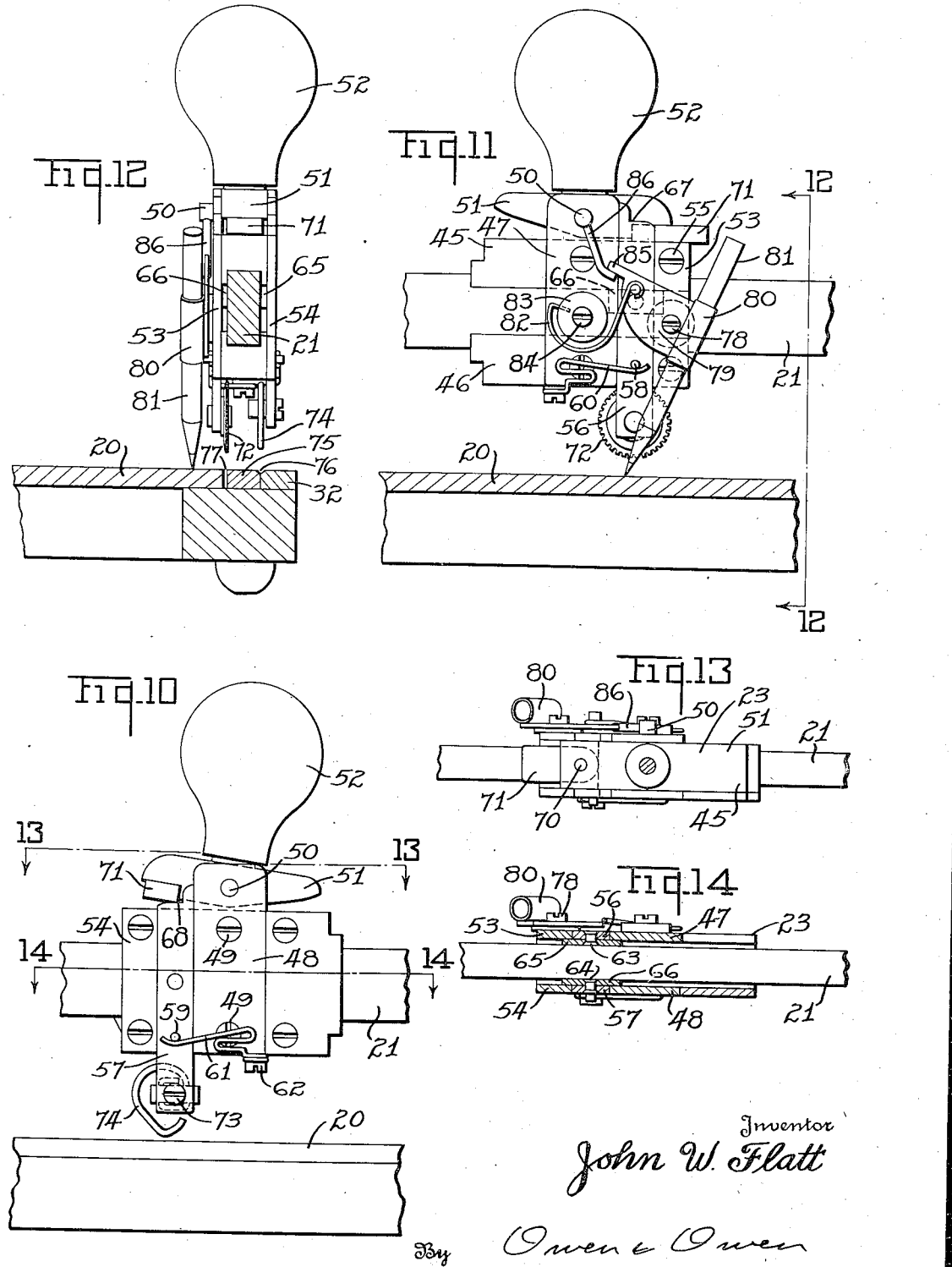

Patented Mar. 17, 1936

2,034,177

UNITED STATES PATENT OFFICE 2,034,177

CUTTING AND DRAWING TABLE

John W. Flatt, Toledo, Ohio, assignor to Frederick W. Flatt, Toledo, Ohio

Application October 20, 1933, Serial No. 694,386

24 Claims. (Cl. 33—32)

This invention relates to a device for cutting, marking, perforating or creasing paper or the like along predetermined lines, and has for its object to provide a compact mechanism by which the various operations may be carried out conveniently, and changes may be made from one operation to another with a minimum of delay and effort. Other objects of the invention will appear as the description proceeds.

In the accompanying drawings, forming a part of this specification, Fig. 1 is a plan view of apparatus embodying one form of the invention. Fig. 2 is a side elevation of the same apparatus, as viewed from the right side of Fig. 1. Figs. 3 and 4 are sectional views along lines 3—3, and 4—4 respectively on Fig. 1. Fig. 5 is a section along line 5—5 of Fig. 3. Fig. 6 is a section along line 6—6 on Fig. 5. Fig. 7 is a plan view of the apparatus, parts being in section, parts removed, and parts adjusted differently from the position in which they are shown in Fig. 1. Fig. 8 is an enlarged detail side elevation of the cutter as shown in Fig. 2. Fig. 9 is a section on the line 9—9 of Fig. 8. Fig. 10 is an enlarged detail elevation of the scoring, perforating and marking device as it is shown in Fig. 2. Fig. 11 is an elevation of the detail shown in Fig. 10, but viewed from the opposite side. Fig. 12 is a sectional elevation of the same detail on line 12—12 of Fig. 11. Figs. 13 and 14 are section plans on lines 13—13 and 14—14 respectively of Fig. 10. Fig. 15 is a detail plan of one portion of the apparatus arranged for a different use from that for which it is shown in Figs. 1 and 7. Fig. 16 is a sectional elevation along line 16—16 of Fig. 15.

The apparatus shown includes a board 20 having a bar 21 mounted over one side thereof. Slidable along bar 21 there is a cutting device 22 and a device 23 which may be adjusted to score a fold crease, to perforate or to rule. Along one side perpendicular to bar 21 there is an adjustable measuring slide 24 having scale marks thereon. Midway of this same side there is a post 25 on which a bar 26 may be mounted in different manners for different purposes. These several devices mounted on the board will be described in detail and then their combined use will be outlined.

Cutter 22, as shown in detail Figs. 8 and 9, comprises a plurality of members assembled to form a carrier 27 slidable along bar 21 by means of an upstanding handle 28. A spindle 29 mounted in carrier 27 forms an axle for hub 30 to which is attached a cutting wheel 31 which cooperates with shear plate 32, attached to board 20.

By moving carrier 27 along bar 21, the cutter wheel is run along the edge of shear plate 32 and any paper or similar material on the board and overhanging its edge is sheared along that edge.

The turning of the cutter is insured by steel ribbons or tapes 33 and 34. Tape 33 has its end 35 inserted in a slot in pin 36 which is mounted in a bracket 37 that supports the left end of bar 21, as viewed in Fig. 2. Pin 36 may be turned to properly adjust the tape, and is held in adjusted position by a set screw 38. The other end of tape 33 is wound about and fastened to hub 30. In a similar manner tape 34 is fastened to a pin 39 adjustable by a set screw 40 in a bracket 41 supporting the right end of bar 21, as viewed in Fig. 2. The other end of tape 34 is likewise wound around and fastened to hub 30, but it is wound in the opposite direction from tape 33.

It will be seen that, as cutter frame 27 is moved to the right, as viewed in Fig. 2, cutter 31 is rotated by the unwinding of tape 33. Since hub 30 about which tape 33 is wound is smaller in diameter than cutter 31, and the periphery of the hub is forced by tape 33 to rotate at a speed equal to the speed of movement of carrier 27 along bar 21, the periphery of cutter 31 is forced to move faster than it would if it merely rolled along the edge of the board. In this way the cutting edge of the wheel makes a drawing cut across the material, and does not merely pinch it off.

Brackets 37 and 41 and bar 21 extend beyond the board so that cutting wheel 31 can be moved all of the way across the board. After it has been moved to the right, a new sheet or pile of sheets may be positioned on the board, and the cutter may be returned to the left, tape 34 forcing it to rotate during this movement in the same manner that tape 33 did during the movement to the right.

The scoring, perforating and marking device, shown in detail in Figs. 10 to 14 inclusive, also slides along bar 21. A carrier is provided by means of blocks 45 and 46 sliding above and below bar 21. These blocks are connected by side plates 47 and 48 which are attached to the blocks by screws 49 and extend above block 45. A pivot pin 50 extends through plates 47 and 48 above block 45 and provides a pivotal mounting for an operating member 51 carrying a handle 52.

Blocks 45 and 46 are likewise connected by plates 53 and 54 which are attached to the blocks by means of screws 55. Plates 53 and 54 are spaced from plates 47 and 48 to provide slideways for carrier slides 56 and 57. Slides 56 and 57 are provided with pins 58 and 59 which rest upon and are normally pressed upwards by springs 60 and 61. The springs are attached to block 46 by a screw 62. Carriers 56 and 57 are attached by rivets 63 and 64 to plates 65 and 66 which slide between bar 21 and the connecting plates of the blocks 45, plate 65 sliding inside of plates 47 and 53 while plate 66 slides inside of plates 48 and 54. Carriers 56 and 57 are provided at their top ends with notches 67 and 68 which are normally above the top of block 45, slides 56 and 57 being held up by springs 60 and 61 to the top of their upward travel which is limited by plates 65 and 66 resting against the underside of block 45, as indicated in Figs. 11 and 12. Pivoted at 70 to operating member 51 there is a latch 71 which may be turned to lie above block 45, as shown in Figs. 11, 12 and 13, or may be swung to either side to rest in notch 67 or 68. In Fig. 10 it is shown resting in notch 68, but it will be readily seen that it may be swung in the opposite direction to rest in notch 67 if desired.

Mounted on the bottom of slide 56 there is a toothed wheel 72. Attached to the bottom of slide 57 by means of a screw 73 there is a scoring wire 74. A metallic strip 75 is mounted in the board next to shear plate 32, the adjacent edges of member 32 and 75 being beveled to form a groove 76 directly beneath scoring wire 74. There is a space between the other side of strip 75 and the adjacent board to provide a groove 77 directly beneath perforating wheel 72.

Attached to plate 53 by means of a screw 78 there is a carrier 79 having a holder 80 for a pencil or pen 81. A spring 82 attached to the carrier 79 is fastened to plate 47 by means of a washer 83 and a screw 84. This spring normally urges the pencil carrier to the position in which it is shown in Fig. 11 with the point of the pencil resting against the board or any paper or other material placed upon the board.

The rear end of carrier 79, as viewed in Fig. 11, is provided with a projection 85 with which there cooperates an arm 96 mounted in pivot pin 50. It will be readily seen that when operating member 51 is swung by handle 52 from the position in which it is shown in Fig. 11, to that in which it is shown in Fig. 10, arm 86 is moved so as to swing carrier 79 about its pivot in opposition to spring 82 so as to raise the point of the pencil from the board.

The operation of the device just described is as follows:

With the parts arranged as they are shown in Fig. 10, it will be readily understood that paper or other material is placed upon the board with a portion, resting over groove 76, which is to be scored. Thereupon handle 52 is seized and swung to the left as viewed in Fig. 10, thereby oscillating member 51 to depress plate 71 and slide 57, thereby pressing wire 74 upon the material therebeneath. Continued force applied to the handle 52 moving it to the left continues to press the wire downward and draw it over the paper or other material, thereby forcing the material downward into groove 76 and thereby scoring and forming a fold line in the material. When handle 52 is moved to the right, as shown in Fig. 10, operating member 51 is oscillated to the position in which it is shown in that figure so that scoring wire 74 is raised off of the material therebeneath and can be moved back to its starting position without operating on the material.

With the parts in the position in which they are shown in Figs. 11 to 13 inclusive, it will be seen that slides 56 and 57 will be held upward out of operating position. Movement of the handle 52 to the right, as viewed in Fig. 11, draws the point of pencil 81 over the paper and thereby rules a line. When the handle 52 is moved in the opposite direction, the pencil is swung up off of the paper so that it is returned without making a mark.

It will be readily understood that latch 71 may be swung to the opposite side from that in which it is shown in Fig. 10, so that it rests in notch 67. When arranged in this manner the operation is the same as that described above in connection with scoring member 74, except that perforating wheel 72 is depressed upon the material and the teeth thereof punch through the material into groove 77 when the wheel is moved to the right, as viewed in Fig. 11, while the wheel is allowed to be raised by spring 60 into inoperative position when the handle 52 is moved to the left, as viewed in Fig. 11.

Whenever it is not desired to have pencil 81 operate, it may be either removed from the holder or raised sufficiently so that it does not contact the material being operated upon.

Measuring slide 24 is operated by a handle 90 in its slideway between a strip 91 attached to the edge of the board and a strip 92. In the form shown, strip 92 is provided with fine scale markings, while slide 24 is provided with comparatively coarse markings. A pointer 93 on slide 24 may be moved by the movement of the slide in its slideway so that it is opposite a point on member 91 indicated as "cut", as shown in Fig. 1, or it may be moved to the several points indicated as "fold", "perf" or "rule", respectively. When in the position in which it is shown in Fig. 1, the indicia on slide 24 indicate the distance from the edge of cutting plate 32. When indicator 73 is moved to the position where it is opposite the word "fold", the indicia on the slide indicate the distance from groove 76. When pointer 93 is moved to register with the point marking "perf", the indicia on the slide indicate the distance from groove 77. When the pointer is moved to register with the word "rule", then the indicia on slide 24 indicate the distance to a line beneath pencil 81. As shown in Fig. 7, there are a plurality of sockets 94 in slide 24 and a ball 95 mounted in a socket 96 in member 91 is normally pressed by a spring 97 against slide 94 and enters any socket 94 in register therewith, sufficiently to hold the slide in place against accidental displacement. Sockets 94 are so arranged as to hold the slide in correct registration with the above described positions for correctly measuring the distance from the line of cutting, scoring, perforation or ruling. The distances between these several positions of slide 24 are exact multiples of the short spaces on strip 92 so that the major markings on slide 24 exactly register with subdivisions on strip 92 when the slide is in any one of its 4 registering positions.

Post 25 carries near its top a member 100 providing a slideway for protractor arm 26, there being an obvious clamping screw arrangement for clamping the slide in any desired position, such screw arrangement not being shown in detail. The end of bar 26 over the board is shown in Fig. 1 as carrying a compass bar 101. This bar is carried in an opening in a pivot pin 102 and may be clamped in any desired position in the pivot pin by a set screw 103. A handle 104 is fastened upon the pivot pin above bar 26. A strip 105 is fastened to bar 101 parallel therewith and slides past a flattened portion of pin 102. The member 105 carries scale indicia which register the distance from a marking device 107 at the end of the compass bar to indicator 108 on pivot pin 102. Thus when member 105 is set to register properly with indicator 108, the radius of the resulting circle is indicated. Strip 105 is shown as being connected to bar 101 by means of screws 109 and 110. It will be seen that this arrangement allows the operation of the compass member to draw a circle of a predetermined size upon any desired portion of a sheet placed upon the board, since the arm 26 can be pivoted about post 25 and slid through holder 100 to the desired distance.

When preferred, arm 26 may be withdrawn from holder 100 and slid into a holder 111 just above bar 91. The end of arm 26 is provided with notches 112 and 113, each notch being in the form of a semi-circle and of a size to register with the central pin post 25. Therefore, when the arm is slid through holder 111 to the proper distance so that one of these notches registers with post 25, the slide 111 may be tightened by a wing nut 114 so as to hold the bar in that position and with the corresponding edge forming an extension of the diameter of post 25. The arm may then be moved about the post to any desired angle.

In the position in which it is shown in Fig. 7, the notch 113 is positioned against post 25 so that the side 115 of arm 26 is in line with an extension of the diameter of post 25. Accordingly, when this side of the arm is moved to any angle indicated on the arcs 116 and 117, the side 115 of the arm forms, with lines parallel with the sides of the board, the angle indicated by the gradations on these arcs, since they are concentric about the center of post 25. In Fig. 7 the dotted line position 120 of arm 26 places it in position to draw lines at angles of 60° and 120° with lines parallel with the sides of the board.

In the position in which arm 26 is shown in Fig. 15, the compass end of the arm is extended away from the board, as in Fig. 7, but the arm is slid through holder 100, as shown in Fig. 1. Thereupon a stop pin 118 is fastened to the end of the arm by a screw 119. The lower end of pin 118 rests against the board, and the end of the arm may be adjusted to hold the stop pin at any point desired upon the board. This is useful when a number of operations are desired upon sheets, at the same distance from the edge of the sheet. Under those circumstances the pin may be adjusted so that the edge of the sheet against the pin will be at the desired distance from the operating line, and the pin may be fastened in this position and thereafter subsequent sheets may be placed in position against the pin and more easily determine the distance of the sheet from the line of operation. A socket may be provided in bracket 41 for receiving pin 118, as indicated in Figs. 1 and 7, so that the pin will be out of the way, but in a readily available position, when not in use.

Strip 92 is preferably raised above the level of the sheet-supporting surface of the board, in order to provide an abutment against which a sheet may be positioned. Slide 24 may merely rest in its slideway, or be dove-tailed therein; but in the form shown it is held in the slideway by two pins 121 mounted in strips 91 and 92 and passing through slots 122 in the slide. The slots may be of a length just sufficient to allow the desired adjustment of the slide, and are so shown in Fig. 7. In that case, the pin acts as a stop limiting the movement of the slide to its extreme operating positions. When the slide is moved to the right, as viewed in Fig. 7, the pins stop it in the proper position to measure sheets for cutting, while upon movement to its other extreme position the pins stop it in position to measure sheets for marking or ruling.

As shown in Fig. 1, the entire surface of the board is lined in squares, and measuring indicia are provided along the side opposite the cutting edge. It is preferable to have the distances between the operating lines equal the width of one square, so that these markings on the board may be used for positioning sheets with respect to cutting, scoring, perforating or marking, as desired.

As previously pointed out, pivot member 102 may be fixed in position above any point on the board, so a circle may be drawn about any desired center; and the lower end 123 of member 102 is rounded so that no center mark need be formed in drawing the circle.

It will be seen, therefore, that apparatus has been provided which will be convenient, compact, and provide features of value for those who work with paper, cardboard or similar material. In this single compact device there is arranged a paper cutter, a scorer, a creaser, a perforator, and a ruler or liner, each operating independently and accurately, and also a compass and protractor, with clear and exact graduations for exact measurement of any desired operation.

By the arrangement of the cutter, and particularly with the cutting wheel driven by the attached tapes at a more rapid speed than a mere rolling speed against the edge of the subjacent cutting plate, an exact draw cut can be made through thin paper that is difficult to cut without folding or displacement in any way, and also an equally accurate shearing cut may be made across a number of thicknesses of heavy paper or the like. The slide 24 may be moved to the point indicated "cut", and the exact distance from the line of cut is thereby indicated by the indicia on slide 24 and strip 92. If a number of sheets or cards are to be cut of the same width, pin 118 may be set against the edge of a card or sheet which is in proper position and thereafter the subsequent sheets may be merely slipped squarely against strip 92 and against the pin and then cut without stopping to look at the exact measurement each time.

If fold lines are to be made, the slide 24 may be moved so that pointer 93 registers with the word "fold", and thereupon the exact distance from the edge of the paper or any point thereon to the score line can be read by the indicia on slide 24 and strip 92. Thereupon latch member 71 is turned to rest in notch 68 and the scorer drawn across the material therebeneath to produce a score by cooperation of wire 74 and groove 76. Of course, the pin 118 can be utilized for easily positioning sheets or cards for scoring as well as for cutting. If a sheet is to be perforated so as to separate therefrom coupons or the like, slide 24 is moved so that indicator 93 registers with the word "perf", and thereupon the sheet to be perforated may be properly arranged and the distance from the perforating line to any point resting against strip 92 is at once accurately read by the indicia upon slide 24 and strip 92. Thereafter latch 71 is turned to rest in notch 67 and handle 52 operated to depress perforating wheel 72 and run it across the material above groove 77 and form the desired line of perforations in the material. The pin 118 may be utilized for positioning a plurality of sheets with respect to the perforating line as well as with respect to cutting and scoring.

When it is desired to rule or otherwise line paper or other material, the slide 24 may be moved until indicator 93 registers with the word "rule", whereupon the distance from the line which will be ruled to any point along strip 92 is exactly indicated by the indicia on that strip and slide 24. The latch 71 is then moved to the position in which it is shown in Figs. 12 and 13 and the pencil or pen adjusted so that it properly contacts the material when handle 52 is moved to the position in which it is shown in Fig. 11, and is raised above the material when handle 52 is moved to the position in which it is shown in Fig. 10. Thereupon the pencil or pen may be drawn across the material therebeneath by movement of its carrier along bar 21 and readily returned without contacting the material on the return movement.

The abutment pin 118 may be used for ruling or lining material when a plurality of sheets are to be ruled at the same distance from the edge, or if a plurality of parallel lines are to be drawn, this may be done readily by moving the material along strip 92 the desired distance between successive lines.

It will be readily seen that by the above arrangement the various operations can be readily carried out in a convenient way by a compact device, the combination of the devices for utilization with a minimum of change in the apparatus being an important point, as well as the advantageous construction of specific features. While the exact construction shown is advantageous and in some respects important, it will be readily understood that various departures may be made from this exact construction within the scope of the appended claims.

What is claimed is:—

1. In apparatus of the character described, a board, a bar mounted over one side of the board, a plurality of devices movable along said bar for operations along parallel lines upon material placed upon the board, a slide movable perpendicularly to the lines and having indicia thereon indicating distances from said lines, an abutment post, and means to fix the post in position a chosen distance from any one of said lines.

2. In apparatus of the character described, a board, a bar mounted over one edge of the board and extending beyond the board at each end, a shear plate mounted on the edge of the board, a cutter carrier slidable along the bar and having a carrier adapted to cut material along said shear plate, a groove along the board parallel with the edge and a scoring device mounted slidably along said bar and in position to press material against the groove and score the same.

3. In apparatus of the character described, a board, a bar mounted over one edge of the board and extending beyond the board at each end, a shear plate mounted on the edge of the board, a cutter carrier slidable along the bar and having a carrier adapted to cut material along said shear plate, a groove along the board parallel with the edge and a perforating device mounted slidably along said bar and in position to press material against the groove and perforate the same.

4. In apparatus of the character described, a board, a bar mounted over one edge of the board and extending beyond the board at each end, a shear plate mounted on the edge of the board, a cutter carrier slidable along the bar and having a carrier adapted to cut material along said shear plate, and another carrier movable along the bar and having means to support a pencil or the like in cooperative relation with material on the board, the carriers being adapted to move along the bar beyond the cooperative portions of the board.

5. In apparatus of the character described, a board, a bar mounted over one side of the board, a carrier movable along the bar, a plurality of devices mounted upon the carrier for operations along parallel lines upon material placed upon the board beneath the bar, and means for selectively operating the devices when the carrier is moved along the bar.

6. In apparatus of the character described, a board, a bar mounted over one side of the board, a carrier movable along the bar, a scoring device mounted upon the carrier, a perforating device mounted upon the carrier, and selective means for operating the scorer or perforator when the carrier is moved along the bar.

7. In apparatus of the character described, a board, a bar mounted over one edge of the board, a carrier movable along the bar, a scorer mounted upon said carrier, a perforator mounted upon said carrier, a handle oscillatably mounted upon the carrier, and selective means for placing the scorer or perforator in operative position by movement of the handle to one extreme of its oscillation.

8. In apparatus of the character described, a board, a bar mounted above one edge of the board, a carrier movable along the bar, a slide mounted for vertical movement upon one side of the carrier and having a scoring device on the bottom thereof, another slide mounted upon the opposite side of the carrier and having a perforating device mounted upon the bottom end thereof, springs normally lifting said devices from operative contact with material placed therebeneath on the board, a handle mounted oscillatably on the carrier, and a latch mounted upon the handle, and movable to selectively engage either of said vertical slides and depress the engaged slide upon oscillation of the handle.

9. In apparatus of the character described, a board, a bar mounted over one edge of the board, a carrier slidable along said bar, a pencil holder mounted upon said carrier, a scorer mounted upon said carrier, a perforator mounted upon said carrier, a handle oscillatably mounted upon said carrier, means connecting the handle and pencil holder for moving the holder out of operative relation when the handle is oscillated in one direction, and means connected with the handle for selectively moving the scorer or perforator into operative position when the handle is oscillated in the other direction.

10. In apparatus of the character described, a board, a bar mounted over one edge of the board, a carrier slidable along the bar, a slide mounted on one side of the carrier and carrying a scoring device, a slide mounted on the other side of the carrier and carrying a perforating device, a pencil holder oscillatably mounted upon the side of the carrier, a handle oscillatably mounted upon the top of the carrier, connections between the handle and the holder oscillating the holder to move a pencil therein into inoperative position when the handle is oscillated in one direction, a spring normally pressing the holder towards operating position, springs normally raising the slides into inoperative position, and a latch pivoted on said handle and in position to lie between said slides or to be pivoted over either one of the slides selectively.

11. In apparatus of the character described, a board having a groove therein, a bar mounted above the groove, a carrier slidable along the bar, a scoring device mounted upon the carrier, a handle movably mounted upon the carrier, and means for pressing the scorer into operative position with said groove when the handle is oscillated in one direction.

12. In apparatus of the character described, a board having a groove parallel with one edge thereof, a bar mounted above said groove, a carrier slidable along the bar, a scorer mounted for vertical movement upon one side of the bar, a handle pivoted to the top of the carrier, and means on the handle engaging and pressing downward the scoring device when the handle is oscillated in one direction.

13. In apparatus of the character described, a board having a groove therein, a bar mounted above the groove, a carrier slidable along the bar, a perforating device mounted upon the carrier, a handle movably mounted upon the carrier, and means for pressing the perforator into operative position with said groove when the handle is oscillated in one direction.

14. In apparatus of the character described, a board having a groove parallel with one edge thereof, a bar mounted above said groove, a carrier slidable along the bar, a perforator mounted for vertical movement upon one side of the bar, a handle pivoted to the top of the carrier, and means on the handle engaging and pressing downward the perforating device when the handle is oscillated in one direction.

15. In apparatus of the character described, a board, a bar mounted above the board, a carrier slidable along the bar, a pencil holder pivoted to one side of the carrier, a spring normally oscillating the holder in a direction to bring a pencil therein into operative relation with a sheet placed upon the board beneath the bar, a handle pivoted upon the carrier, and a member connected to the handle and engaging the holder to move a pencil therein out of operative relation with a sheet placed upon the board beneath the bar when the handle is moved in one direction, and releasing the holder when the handle is moved in the other direction.

16. In apparatus of the character described, a board having a shear plate along one edge thereof, a cutting wheel, means for moving the cutter along and in shearing relation with said shear plate, and means to rotate the cutter at a speed faster than a rolling motion with respect to the shear plate.

17. In apparatus of the character described, a board, a shear plate along one edge of the board, a bar above said edge of the board, a carrier movable along the bar, a cutting wheel mounted upon the carrier in cooperative relation with said shear plate, a hub on the cutter and elongated flexible members fastened at the ends of the bar and connected to and wound about said hub whereby the cutter is rotated by said members upon movement of the carrier along the bar, said rotation of the cutter being at the speed greater than a rolling motion with respect to the shear plate.

18. In apparatus of the character described, a board, a bar above one edge of the board, a plurality of devices movable along the bar for operations along parallel lines upon material placed upon the board beneath the bar, and a slide movable perpendicularly to said lines and having measuring indicia thereon suitable for indicating distances from said several lines in accordance with the position of the slide.

19. In apparatus of the character described, a board, a slide with indicia thereon movable parallel with one edge of said board, and a plurality of devices operable along lines at right angles to said slide to operate upon the material placed upon said board.

20. In apparatus of the character described, a board, an elongated slide mounted upon said board and having indicia thereon, a plurality of devices operable along parallel lines at right angles to the slide to operate upon material placed upon the board, and means to indicate the proper positions of the slide for measuring distances from the respective lines.

21. In apparatus of the character described, a board, an elongated slide mounted upon said board and having indicia thereon, a plurality of devices operable along parallel lines at right angles to the slide to operate upon material placed upon the board, means to indicate the proper positions of the slide for measuring distances from the respective lines, and means for holding the slide registered in the respective positions.

22. In apparatus of the character described, a board, an elongated slide mounted upon said board and having indicia thereon, a plurality of devices operable along parallel lines at right angles to the slide to operate upon material placed upon the board, means to indicate the proper positions of the slide for measuring distances from the respective lines, a notch in the slide for each of said lines, and a spring catch adapted to enter the respective notch when the slide is in position to indicate the distance from the respective line.

23. In apparatus of the character described, a board, a slide at one side of the board, a thin strip along one side of the slide, a plurality of devices operable along parallel lines at right angles to the slide to operate upon sheets of material placed upon the board, indicia on the slide indicating major units of length, indicia for short units of length upon said strip, and means for indicating the position of the slide to indicate distances from the several parallel lines, the distances between the parallel lines being in each instance a multiple of the short units of space indicated on the strip.

24. In apparatus of the character described, a board, a post at one edge of the board, a protractor arm, a plurality of clamps for the arm mounted at different vertical elevations upon the post, means for operating along a straight line upon a sheet placed upon the board, and a stop device mounted upon the arm and positionable at any desired distance from said line by clamping the arm in the desired position in the upper clamp upon the post.

JOHN W. FLATT.